March 5, 1935.   A. DENNER ET AL   1,992,995
MACHINE FOR PEELING TOMATOES
Filed Nov. 4, 1933   5 Sheets-Sheet 4
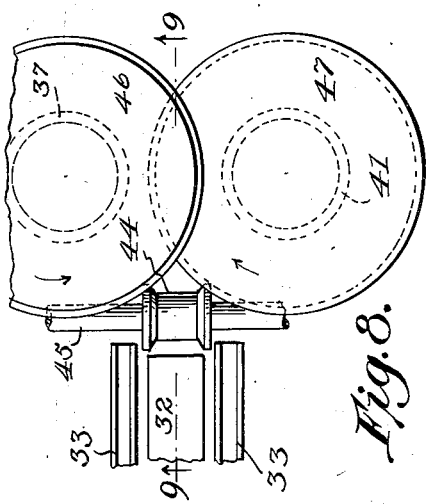
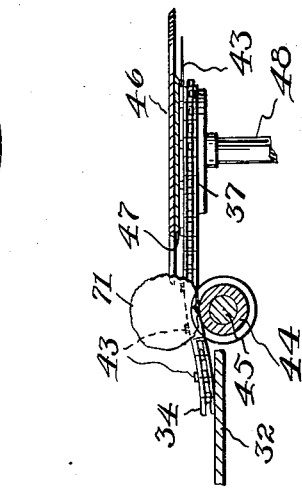
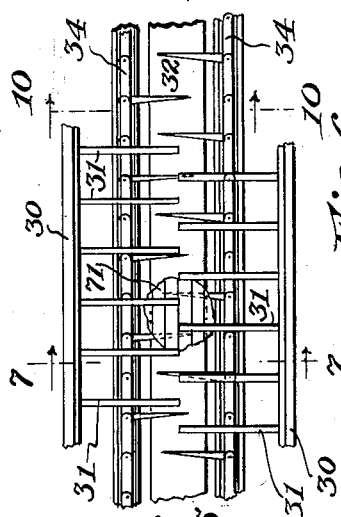
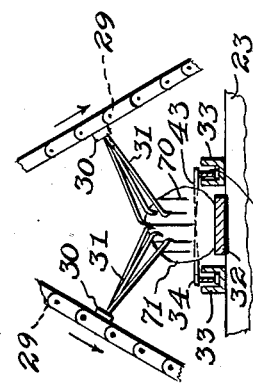
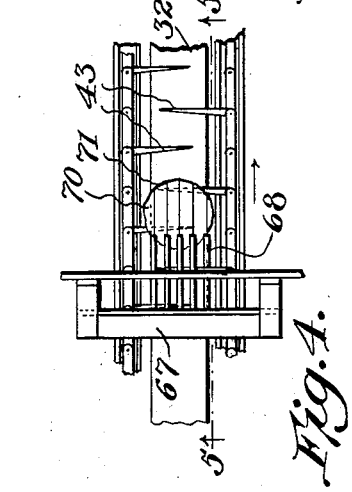
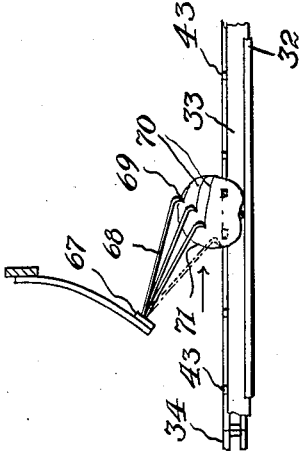
INVENTORS.
August Denner
Philip Keiner
BY
Charles B. Mann Jr.
ATTORNEY March 5, 1935.  A. DENNER ET AL  1,992,995
MACHINE FOR PEELING TOMATOES
Filed Nov. 4, 1933  5 Sheets-Sheet 5

INVENTORS.
August Denner
Philip Keiner
BY
Charles B. Mann Jr,
ATTORNEY

Patented Mar. 5, 1935

1,992,995

UNITED STATES PATENT OFFICE 1,992,995

MACHINE FOR PEELING TOMATOES

August Denner and Philip Keiner, Baltimore, Md.

Application November 4, 1933, Serial No. 696,661

5 Claims. (Cl. 146—43)

This invention relates to improvements in machines for peeling fruits or vegetables and is especially directed to a machine for removing skin from tomatoes.

One object of the invention is to provide a comparatively simple and improved machine that may continuously receive tomatoes and remove the peel or skin therefrom in an expeditious manner and with practically no waste.

Another object of the invention is to provide an improved mechanism whereby the skin of the article of fruit or vegetable that is to be removed may first be scored in one direction and then removed by means that travels in a direction substantially at right angles to the score lines previously made.

With these, and other objects in view, the invention is illustrated in the accompanying drawings wherein,—

Fig. 4 illustrates in top view, a fragment of the conveyer and the skin-scoring device at the front end of the machine.

Fig. 5 shows the same in side elevation as viewed on the line 5—5 of Fig. 4.

Fig. 6 illustrates in top view another fragment of the conveyer and the peeling claws.

Fig. 7 shows the same in cross-section as viewed on the line 7—7 of Fig. 6.

Fig. 8 illustrates another portion of the conveyer in top view at the discharge-end of the machine together with the means for raising the peeled tomato and delivering it to the cutters.

Fig. 9 shows a sectional elevation through the same as viewed on the line 9—9 of Fig. 8.

Figure 1:
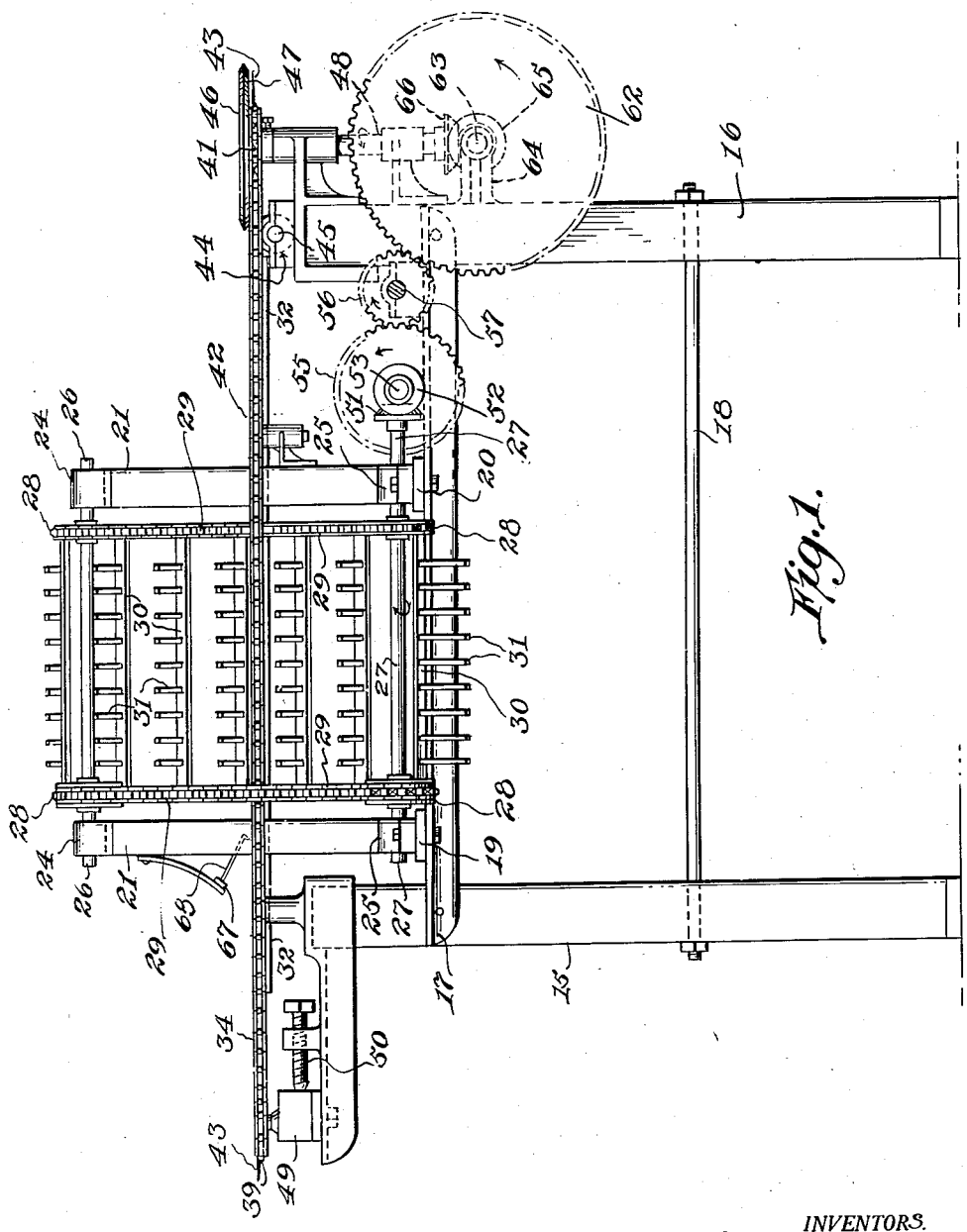
Fig. 1 shows the machine in side elevation.
Figure 2:
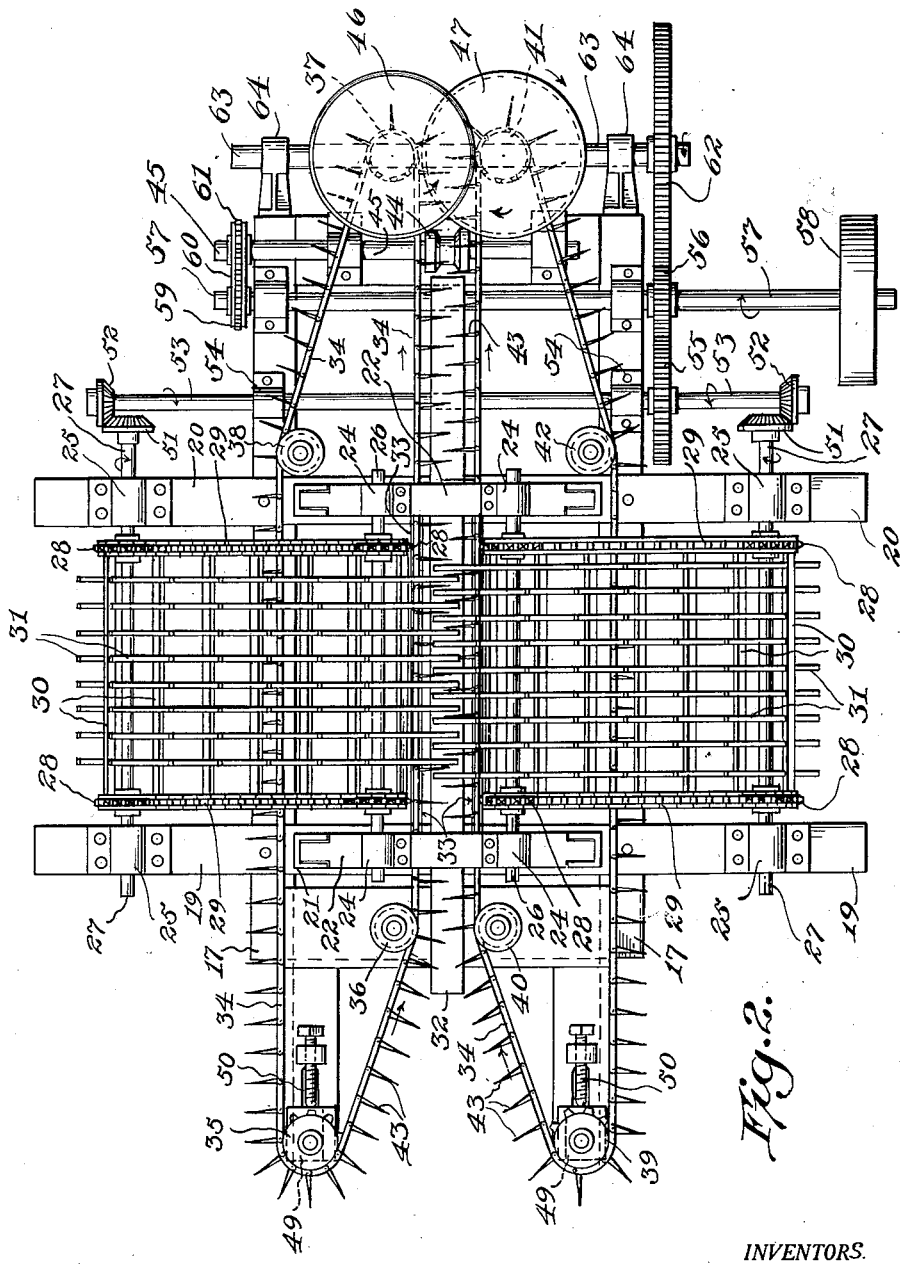
Fig. 2 illustrates the same in top view.
Figure 3:
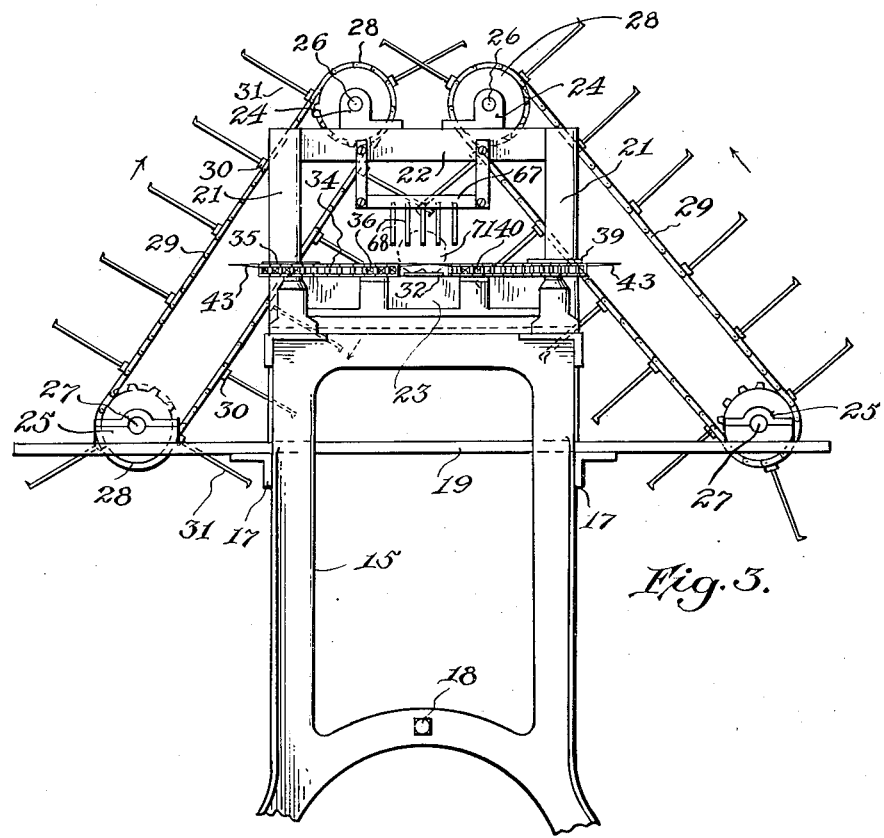
Fig. 3 shows the machine in front-end elevation.
Figure 10:
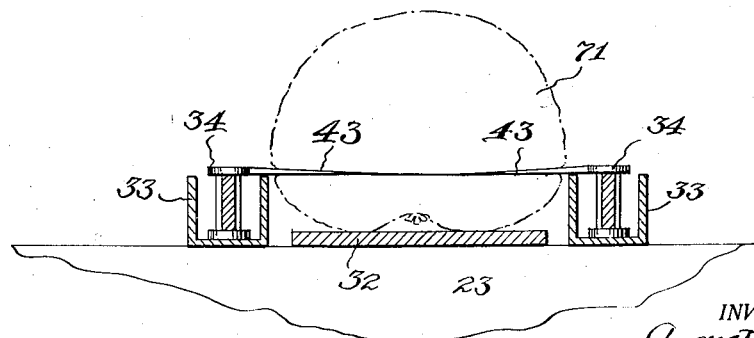
Fig. 10 illustrates an enlarged cross-sectional detail through the conveyer and the tomato-supporting plate,—the section being taken on the line 10—10 of Fig. 6.

Referring particularly to Figs. 1, 2 and 3 of the drawings, the numeral 15 designates one end-frame of the machine and 16 the other end-frame thereof. These two end-frames are rigidly connected at each side by horizontal angle-bars 17 and by a central tie-bar 18 so that the two frames with the angle and tie-bars will form a rigid structure for carrying the various parts of the entire machine.

Figure 11:
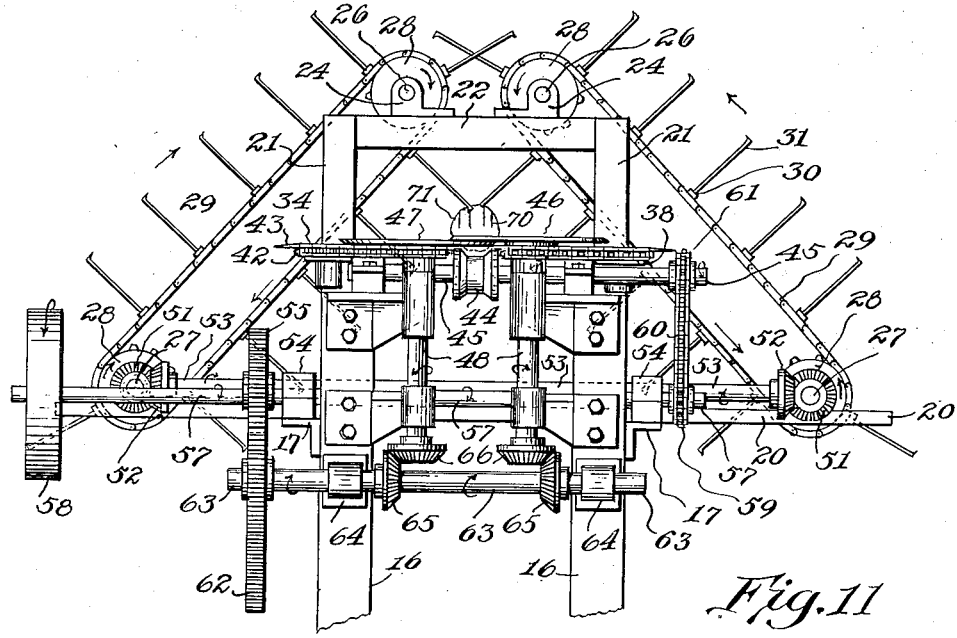
Fig. 11 shows the machine in end elevation as viewed at the discharge-end thereof.
Figures 12, 13:
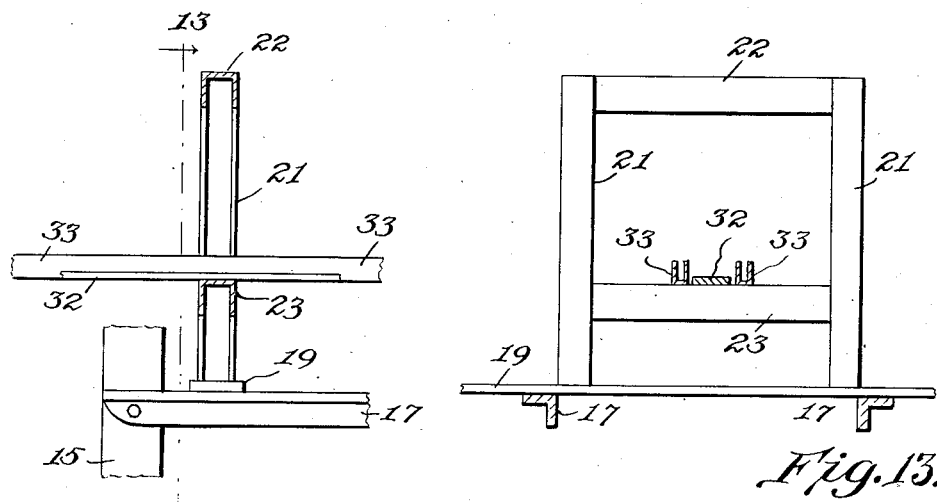
Fig. 12 illustrates in vertical section one of the vertical supplemental frames.
Fig. 13 shows the same in front elevation as viewed on the line 13—13 of Fig. 12.

Two horizontal bars 19 and 20 extend crosswise and are rigidly secured on top of the angle-bars 17 and these horizontal bars project outwardly beyond said angle-bars, as clearly shown in Figs. 2, 3 and 11 of the drawings.

Extending vertically from each horizontal bar 19 and 20 there is a frame comprising two vertical bars 21; a top cross-bar 22 and an intermediate horizontal cross-bar 23. These supplemental frames are spaced apart because they are to carry an endless series of peeling devices, presently to be explained.

On the top cross-bar 22 of each supplemental frame there are two upper shaft-bearings 24 and on the outer projecting end of each of the horizontal bars 19 and 20 there are other and lower shaft-bearings 25.

Horizontal upper shafts 26 are carried in the upper bearings 24 while horizontal shafts 27 are carried in the lower bearings 25.

Sprocket wheels 28 are carried on the upper and lower shafts 26 and 27 and chains 29 pass over said wheels.

By reference to Figs. 3 and 11, it will be noted that the relative positions of the upper and lower shafts 26 and 27 are such that the chains 29 travel in an inclined direction, because the lower shafts 27 and their sprockets are wider apart than the upper shafts 26.

Each pair of sprocket chains 29 carry an endless series of horizontal cross-bars 30 and each cross-bar is provided with a series of spring-fingers 31 which have the function of peeling claws, as will presently be explained.

The spring fingers 31 project from the cross-bars 30 in horizontal rows and the fingers carried on the bars at one side of the machine are staggered with respect to those on the bars at the opposite side whereby the two sets of fingers will clear and cross each other as they pass around the upper shafts and travel downward on the under stretches of the chains.

The intermediate horizontal cross-bars 23 of the supplemental frames support a flat plate 32 which latter extends longitudinally of the machine.

At each side of the flat longitudinal plate 32, there is a channel guide 33 and these guides are also supported on top of the intermediate horizontal bars 23.

An endless sprocket-chain 34 extends horizontally through each of the channel guides 33,—one chain passing around a sprocket wheel 35 at the entrance-end of the machine, then around an idler 36 then along one side of the flat plate 32 to a rear sprocket 37; then about another idler 38 and back to the sprocket wheel 35. The other chain passes around a front sprocket 39; then about an idler 40, and along the opposite side of the flat plate 32, then about a rear sprocket 41 to another idler 42 and back to the front sprocket again.

Thus the two chains 34 are caused to travel continuously with their confronting stretches traveling in the same direction at opposite sides of the central flat plate 32.

These two chains are provided at suitably spaced intervals with horizontally-extending prongs or fingers 43 which project over the flat plate 32 as they are advanced, as and for a purpose that will presently be explained.

The purpose of passing the inner stretches of the chains 34 through the channel guides 33 is to sustain the chains at the opposite sides of the flat plate 32 and prevent them from sagging as they travel from the front to the rear end of the machine.

At the rear end of the horizontal plate 32, there is a grooved roller 44 mounted on a horizontal shaft 45 while beyond this roller there are two circular cutters 46 and 47 mounted on the upper ends of vertical shafts 48. These vertical shafts 48 also carry the rear sprockets 37 and 41 around which the chains 34 pass.

The front sprockets 35 and 39 are mounted on blocks 49 which are adjustable horizontally by means of adjusting screws 50 so that slack in the chains may readily be taken up.

The inclined sprocket chains 29 are continuously driven so that their under stretches, shown in Figs. 3 and 11, will travel downwardly and thus carry the spring fingers 31 so they will pass in an inclined direction over the opposite sides of the flat longitudinal plate 32.

These chains 29 are driven by bevel gears 51 on the lower shafts 27, meshing with similar gears 52 that are carried on a horizontal shaft 53 which extends all the way across the machine and is supported in bearings 54 on the angle-bars 17.

This shaft 53 carries a gear 55 which is driven by a gear 56 on another horizontal shaft 57. This shaft 57 is the main drive-shaft and has a pulley 58 on one end while the opposite end of said shaft extends to the opposite side of the machine and carries a sprocket wheel 59.

A chain 60 passes around said sprocket wheel 59 and extends up to roll-shaft 45 where it passes around a sprocket 61 so as to drive the roll-shaft, as clearly shown in Figs. 2 and 11.

The gear 56 on drive shaft 57 also meshes with and drives a gear 62 on a horizontal shaft 63 at the extreme rear of the machine.

This shaft 63 is sustained in bearings 64 carried on the end-frame 16 and bevel gears 65 and 66 serve to connect the vertical cutter-shafts 48 with said shaft 63.

It is therefore to be understood that the horizontal feed chains 34 are continuously operated; that the inclined chains 29 with their bars 30 and spring-fingers 31 are also continuously operated; that the cutters 46 and 47 are continuously revolved and that the roll shaft 45 and its grooved roll 44 are also continuously revolved.

At the front end of the machine, we provide a cross-bar 67 which is hung from the upper bar 22 of the forward supplemental frame so as to extend horizontally over the flat plate 32 and the confronting stretches of the chains 34.

This cross-bar 67 is provided with a series of spring blades 68, best shown in Figs. 3, 4 and 5 of the drawings, which blades extend laterally in the direction of the movement of the chain.

These blades yieldingly project toward the flat plate and have sharpened down-turned ends 69 that lie in the path of the article of fruit or vegetable that may be moved by the chains along the plate and operate as will presently be explained.

By reference to Figs. 2, 3 and 11 it will be noted that the return stretches of the horizontal chains 34, in returning from the cuter-shafts 48 back to the front end of the machine, pass through the two stretches of the inclined chains 29.

Presuming now that it is desired to remove the skin from tomatoes.

The tomatoes 71 are first steamed or scalded and are then fed into the front end of the machine onto the flat horizontal plate 32. In practice, the present machine may readily be placed so that the vegetables from the scalder will be delivered directly onto the end of flat plate 32.

The tomatoes, when placed on the plate 32 will be engaged by the prongs or fingers 43 projecting from the chains 34, and as the chains advance the tomatoes will be drawn along said plate 32.

As the tomatoes pass under the spring blades 68, the pointed ends 69 of the latter will drag over the skin, yielding while doing so in order to conform to the shape of the tomato, and as the tomato passes under these blades, the ends of the latter will produce a series of score lines 70 through the skin,—the lines 70 extending in the direction of travel of the tomato.

The tomato is then advanced along the plate 32 until it passes beneath the path of the series of spring-fingers 31 that are moved by the inclined chains 29.

By reference to Figs. 3, 6, 7 and 11, it will be seen that as these fingers 31 travel downwardly, they will drag in a direction crosswise of the direction of travel of the tomato and also in a direction substantially at right angles to the score lines 70 that have previously been cut through the skin of the tomato. This crosswise scraping of the spring-fingers 31 across the tomatoes peels the skin therefrom in opposite directions from the vertical center.

The fact that the tomato is moving forward while this lateral scraping takes place does not interfere with this operation as one set of spring fingers will partially draw the skin down toward opposite sides while the next set of fingers will carry the peel or skin down a little further until the skinned tomato passes beyond the reach of the traveling fingers.

The skinned tomato is then conveyed along the plate 32 and when the grooved roller 44 is reached, the core or stem-side of the tomato will ride up over the grooved roller thereby drawing the prongs 43 that are piercing the tomato down close to the core-side and as this operation is completed the tomato is delivered to the cutters 46, 47 which slices the core-side from the main part of the tomato and leaves the latter on the upper side of the cutters from which it will be removed in any suitable manner.

Having described our invention, we claim,—

1. In a machine for peeling tomatoes the combination with a flat supporting plate, of a pair of horizontal chains having parallel stretches at opposite sides of said plate, a series of horizontal pins projecting from the chains and extending over the plate as they travel with the chains, said pins impaling the tomatoes and conveying them along the flat plate, a series of yielding peeling devices at opposite sides of the flat plate and means for moving the yielding peeling devices downwardly in oppositely-inclined directions over the flat plate and tomatoes carried thereon to peel the skin downwardly from the upper to the lower sides of the tomatoes while the same are advancing.

2. In a machine for peeling tomatoes the combination with a flat horizontal plate on which the tomatoes are supported while they travel, of means for conveying the tomatoes in single file over said plate, endless carriers arranged in an inclined direction with respect to said flat plate,— one at each side of the latter and an endless series of yielding peeling devices on each endless carrier said peeling devices being movable with their carriers so as to drag downwardly at opposite sides of the plate and over the tomatoes as the latter pass said peelers.

3. In a machine for peeling tomatoes the combination with a stationary horizontal support, of a separate endless carrier at each side of the support and each carrier having a series of pins to extend over the support and engage and move the tomatoes along said support, an inclined carrier at each side of the said support and each inclined carrier having a series of peeler devices projecting therefrom, and means for operating the inclined carriers to move the peeling devices downwardly over the stationary support and the tomatoes to peel the skins as the tomatoes are advanced along the support.

4. In a machine for peeling tomatoes the combination with a stationary support, of two horizontal endless carriers each having means to engage and move the tomatoes along in a single file over said support, means at each side of the stationary support for peeling the skins laterally from the tomatoes as they are advanced, cutters for cutting horizontally through the tomatoes after the skins have been peeled therefrom and roller means for pressing the tomatoes up as they are delivered to the cutters.

5. In a machine for peeling tomatoes the combination with a flat horizontal plate to support the tomatoes in a single file, of a channel guide at each side of the flat plate, an endless chain having a horizontal stretch moving through one of said guides at one side of the flat plate, an endless chain having a horizontal stretch moving through the other guide at the opposite side of said plate, said two endless chains having pins projecting therefrom so they may extend over said plate and engage and move tomatoes along said plate, yielding means for dragging over the tops of the traveling tomatoes to score the skins in a direction parallel with their line of travel, an inclined endless carrier mounted to travel downwardly past one side of said plate, another inclined endless carrier mounted to travel downwardly past the other side of said plate and peeler fingers carried by each endless carrier to engage and strip the skin from the tomatoes as they are drawn along said plate.

AUGUST DENNER.
PHILIP KEINER.